Patented June 13, 1939

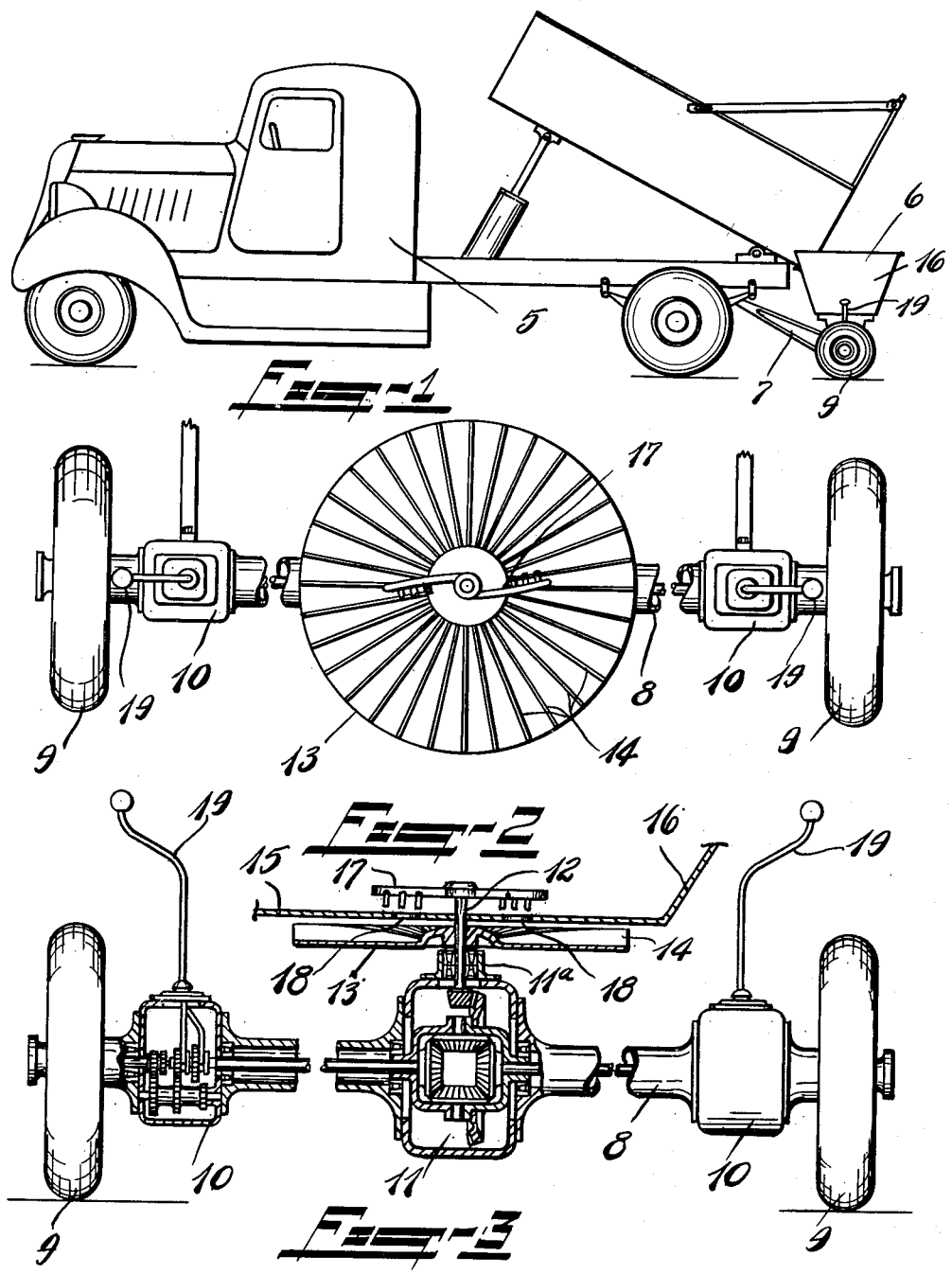

2,162,103

UNITED STATES PATENT OFFICE 2,162,103

SANDING AND SPREADING DEVICE

Orrie C. Middleton, Corunna, Mich., assignor of one-half to Hugh L. Hartley, Owosso, Mich.

Application March 5, 1938, Serial No. 194,108

4 Claims. (Cl. 275—8)

This invention relates to spreading devices such as used for spreading materials of various kinds, sanding highways and slippery surfaces, and more particularly to means for controlling and varying the speed of the slinger disc.

One of the prime objects of the invention is to design a material slinger provided with a live drive axle equipped with transmissions so that the R. P. M. of the differential may be varied with relation to the rotation of the ground engaging wheels.

Another object is to design a wheeled material slinger provided with a live axle and revolvable slinger disc, and provide means on said axle for controlling and varying the speed of said slinger disc with relation to the wheels.

A further object is to provide a simple, practical and substantial spreading device composed of few parts, all of sturdy construction, which can be economically manufactured and assembled, and which is simple and easy to operate.

The above and other objects will appear as the specification progresses, reference being had to the accompanying drawing in which I have shown the preferred embodiment of my invention, and in which like reference numerals indicate like parts throughout the several views thereof.

In the drawing:

Fig. 1 is a side elevational view showing my spreading device attached to a conventional dump truck.

Fig. 2 is an enlarged part sectional rear view.

Fig. 3 is a fragmentary top plan view.

In the present illustration I have shown the spreader device attached to a truck and for the purpose of spreading sand, but it will be understood that it can be used for spreading phosphates and granular material of any kind.

Referring now more particularly to the drawing in which I have shown one embodiment of my invention, the numeral 5 indicates a power vehicle such as a conventional dump truck, and to which the spreading device 6 is attached by means of a draw bar 7 in the usual manner, this spreading device comprising an axle 8 on which the ground engaging wheels 9 are mounted and standard transmissions 10 are provided intermediate the length of said axle at points directly adjacent the ground engaging wheels 9.

A standard differential 11 is provided in the axle in the usual manner, the neck 11a of the differential housing projecting vertically, and a drive shaft 12 is journaled therein, and is driven from said differential, a slinger plate 13 being mounted on said shaft and is provided with radially extending vanes 14, thence this shaft projects through the bottom plate 15 of the body 16 and an agitator 17 is mounted on the upper end thereof, openings 18 being provided in the bottom plate to permit the passage of sand or other material, all as shown and described in my companion application filed of even date herewith.

In practice the device is drawn by a power vehicle, and it is necessary that the slinger disc and agitator be rotated at or near a predetermined R. P. M. in order that an even spread of the sand or other material may be obtained. For obvious reasons the speed of the power vehicle which serves to draw the spreading device may be too high or too low to rotate the slinger disc at the required R. P. M., and this then can be regulated by shifting one transmission into low and the other into high or any other required combination, by means of the shift levers 19, so that the proper R. P. M. is secured.

From the foregoing description, it will be clearly obvious that I have perfected a simple, practical, substantial axle mechanism for sanding devices and the like.

What I claim is:

1. A sanding and spreading device of the character described comprising an axle provided with ground engaging wheels, a differential, a disc associated therewith and a change speed transmission interposed between the ends of the axle and the differential for selectively varying the speed of said differential with relation to the wheels when the axle is driven.

2. A sanding device of the character described comprising a live axle having ground engaging wheels mounted thereon, a differential forming a part of said axle and including a slinger disc associated with and driven from the differential, and means on said axle and interposed between the wheels and said differential for varying the speed of rotation of the slinger disc with relation to the speed of the wheels.

3. A sanding device of the class described and comprising a live axle provided with ground engaging wheels, a differential forming a part of said axle, a shaft extending from the differential and having a slinger disc mounted thereon, and transmission units interposed between the wheels and the differential and adapted to be manually actuated for varying the speed of rotation of the slinger disc with relation to the wheels.

4. A device of the character described and comprising a live axle provided with ground engaging wheels, a differential, driven means connected to said differential and driven thereby, and a transmission interposed in the axle between each wheel and the differential for controlling the speed of the driven means with relation to the wheels.

ORRIE C. MIDDLETON.